April 9, 1940. C. G. WRIGHT 2,196,717
STORAGE BATTERY TERMINAL CLAMP
Filed Nov. 8, 1937 2 Sheets-Sheet 1
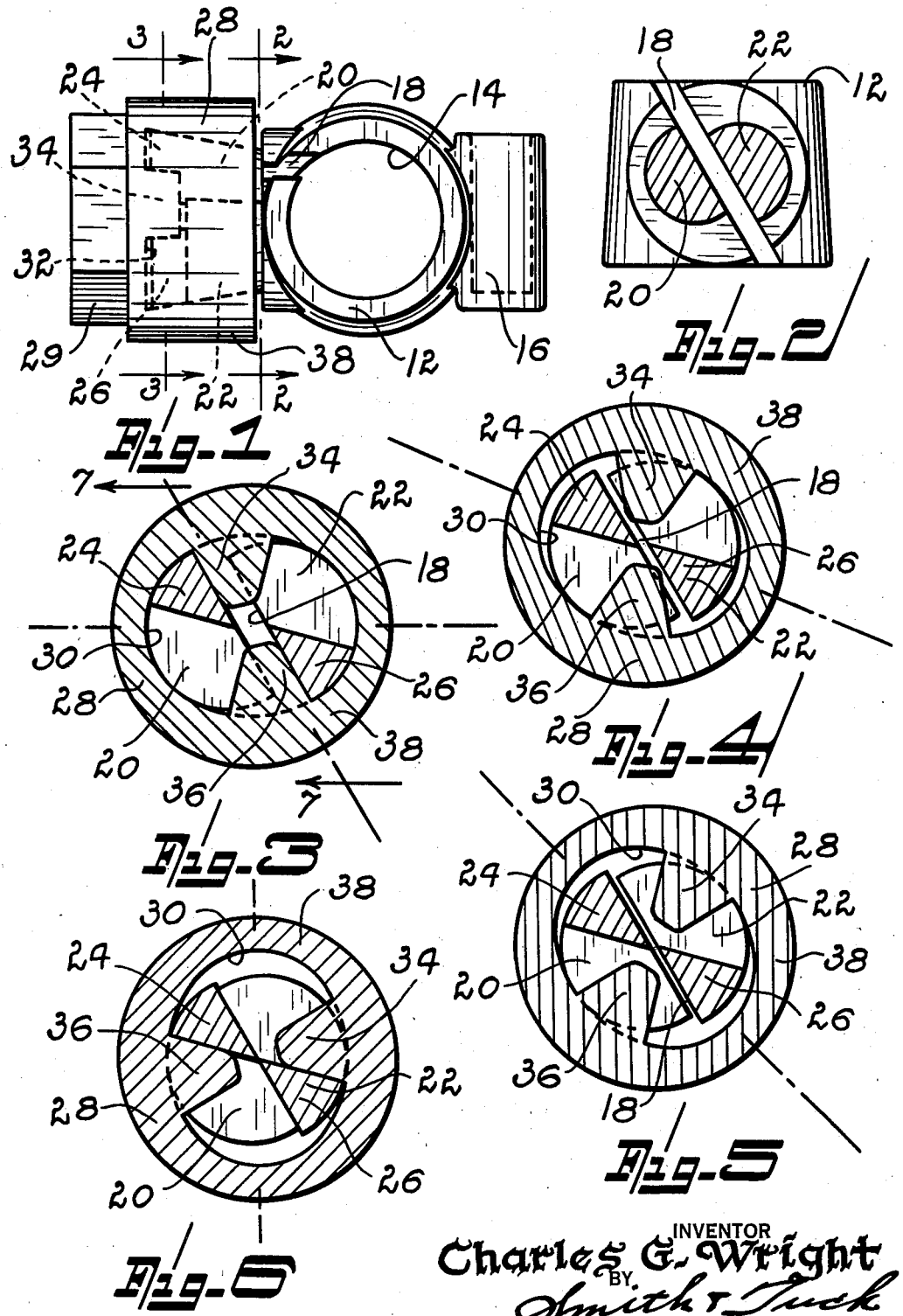
Charles G. Wright INVENTOR
BY Smith & Tuck
ATTORNEYS

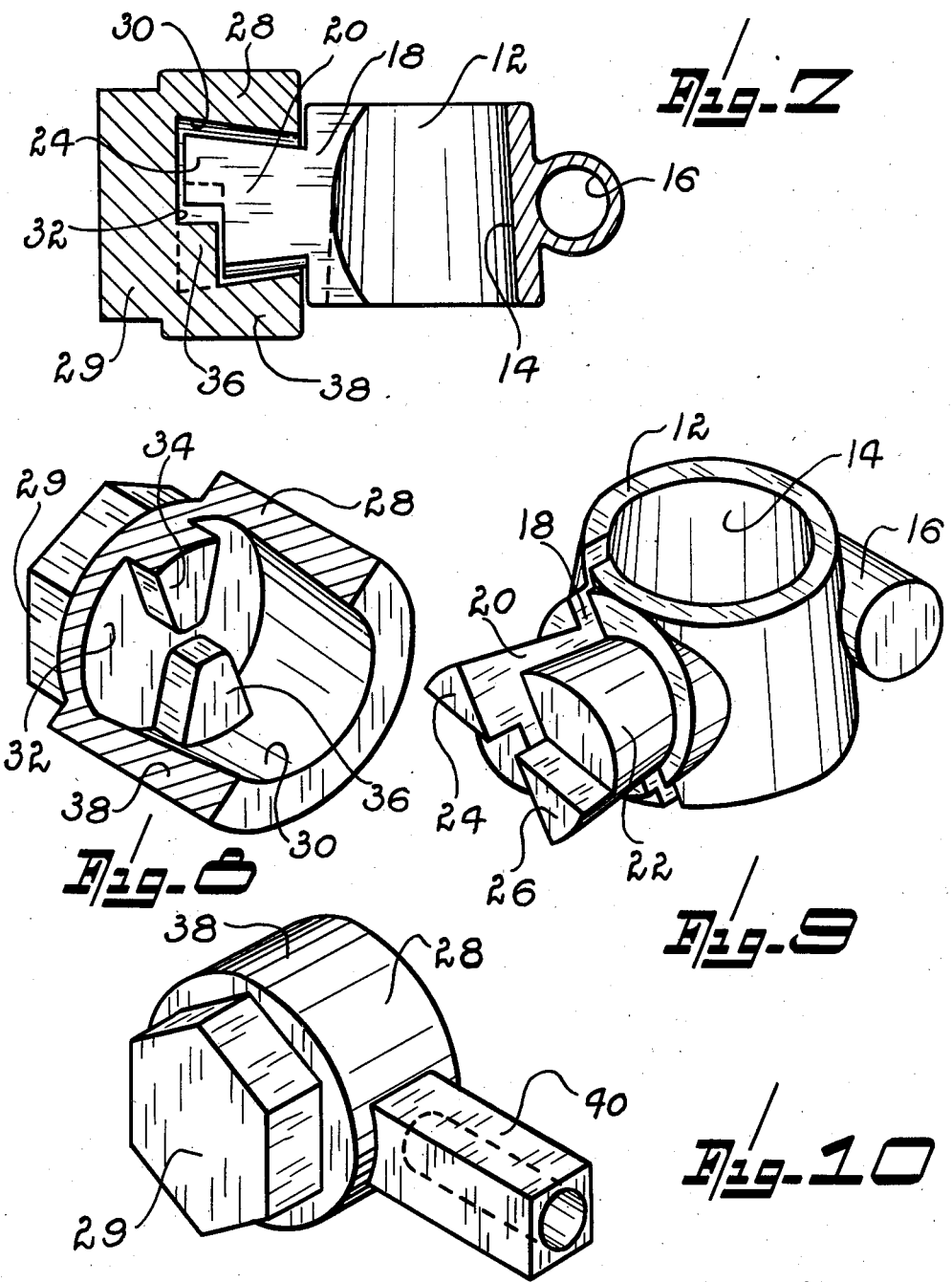

Patented Apr. 9, 1940

2,196,717

UNITED STATES PATENT OFFICE 2,196,717

STORAGE BATTERY TERMINAL CLAMP

Charles G. Wright, Seattle, Wash., assignor of one-third to H. William Johnson and one-third to Kenneth K. Kendrick, both of Portland, Oreg.

Application November 8, 1937, Serial No. 173,458

4 Claims. (Cl. 173—259)

My present invention relates to the art of storage battery accessories and more particularly to a storage battery connector clamp.

The present invention is drawn to a battery connector terminal that has as its principal object the provision of a clamp member for attaching the battery cable to the battery terminal post, in a manner which will greatly facilitate making and breaking these connections. Those battery clamps which have been observed are for the most part provided with a collar-like member which encircles the battery terminal post and are provided with a threaded bolt joining the two ends of the bands together to clamp them on the terminal post. Such an arrangement has many shortcomings, chief among which is that normally the bolt is of different material than the clamp and as the electrolyte is from time to time flushed over the terminals serious erosion and electrolytic action takes place which usually results in destroying the usefulness of the bolt or, at least, so corrodes the same that its operation is very difficult. Even under ideal conditions, however, a great deal of time is lost in disconnecting and connecting battery cables with such a clamp. With my device the various parts of the clamp may be made of the same material so that no electrolytic couple is provided. Then, too, the construction is such that a one quarter turn of the clamping nut proper will securely engage the terminal post. A quarter turn in the opposite direction will fully release the same and at the same time expand the free ends of the clamp proper so that it can be easily removed from the terminal post.

The various parts of my present device are so arranged that once assembled there are no loose parts that can become disconnected or misplaced, and when clamped on to a terminal the operation is a gradual camming one which, with very little effort, can put an unusual clamping strain on the terminal post and thus secure a perfect connection and one that will not become loosened through vibration, jolting and the like, to which the average cables, particularly those installed in automobiles, are subjected.

A further advantage of my terminal clamp resides in the fact that when the camming action is complete the rotating nut is effectively locked against rotation which would tend to loosen it thus providing a measure of real security. Usually when the present battery clamp is jolted off the terminal post the first knowledge the owner has, on many cars, is the burning out of the car lights, or in case of daylight driving, quite often the first indication he has is when the car generator itself has burned out through not having suitable resistance to work against. It is to serve these various objects that I have provided my present battery clamp.

Other and more specific objects will be apparent from the following description taken in connection with the accompanying drawings, wherein Figure 1 is a top plan view of a battery terminal made after the teachings of my present invention the same, as is also true of the other views illustrated, being shown on an enlarged scale.

Figure 2 is a cross-sectional view taken along the line 2—2 of Figure 1.

Figures 3, 4, 5, and 6, are cross-sectional views taken along the line 3—3 of Figure 1, illustrating successive steps in the operation of my battery terminal clamp.

Figure 7 is a sectional view taken substantially along the line 7—7 of Figure 3.

Figure 8 is a perspective view of the clamp nut employed with my clamp, certain parts being broken away and shown in section to better illustrate its construction.

Figure 9 is a perspective view of my battery terminal clamp with the clamp nut removed.

Figure 10 is a perspective view showing a slightly modified form of my clamp nut construction.

Referring to the drawings, throughout which like reference characters indicate like parts, 12 designates the band portion proper of my battery clamp. This member should have an interior bore 14 made to conform to the type of battery terminal post with which the device is to be used. Normally, this bore is tapered and has a length substantially equal to the height of the conventional terminal post. The normal manner of connecting the battery cables employed is that I provide a tubular portion 16 which forms a recess into which the battery cable is sweated, or otherwise secured.

Band 12 is split at one point somewhat after the construction of the conventional clamp. In this instance, however, I have departed from the conventional in that I prefer to have my gap, 18, angularly disposed as is probably best illustrated in Figures 2 and 9. This gap goes clear into bore 14 and provides the two similar lug portions 20 and 22.

Lug portions 20 and 22 have a cross-sectional form that is substantially semi-circular. This arrangement is probably best illustrated in Figure 2. The surface of lugs 20 and 22 are provided with a taper which is smallest in diameter adjacent band 12 and largest at their outer ends. Each of the lugs 20 and 22 is further provided with operating and locking lugs 24 and 26, respectively, which are pie shaped segments, the proportions of which will probably be best understood from Figures 3 to 6, inclusive.

Encircling lugs 20 and 22 is the locking clamp nut proper 28. This member is provided with a tapered elliptical bore corresponding to the taper of lugs 20 and 22 so that once the cap has been secured in place it will not pass off the ends of lugs 20 and 22. The assembly of this unit can be effected in many ways known to persons skilled in this line of work. The members may be deformed and assembled or nut 28 may be cast in place by using parting material over lugs 20 and 22, which have been precast so that when covered with the parting material a core is provided for making the tapered recess 30 of nut 28. In the closed end of bore 30 and formed as part of base 32 of nut 28 are two operating lugs 34 and 36. Best practice indicates that these should be formed as part of nut 28 at the time it is cast so that they will be strengthened by the skirt portion 38 of nut 28 and by the end wall 32.

In Figure 10 I have shown a modified form of construction in which the cable lug 40 is formed as part of cap 28 and acts as a handle for operating the same. In many instances this arrangement provides an additional locking means particularly when used with a short connector cable.

Method of operation

In operating my device assuming it to be fully assembled the band or ring portion 12 is fitted over the battery terminal post so that bore 14 comes into snug engagement with the post. The operator may then grasp the enlarged portion of nut 28 with the hand, or may apply a wrench to the nut-like extension 29 and turn nut 28. The nut is then revolved one-quarter turn, or ninety degrees of revolution, in a clock-wise direction as viewed when facing the terminal post which is the sense in which the views in Figures 3, 4, 5, and 6 have been taken.

At the beginning of the rotation the two substantially semi-circular lugs 20 and 22 were disposed along the major axis of the elliptical bore 30 and as the rotation of nut 28 continues the two lugs are forced closer together until the extreme case is reached as shown in Figure 6 where the two lug portions are in tight engagement and held in that position by lugs 34 and 36 abutting, respectively, lugs 24 and 26.

In this position it will be understood it is believed that the two members are substantially locked in position owing to the fact that the flattest portion of the curve of the elliptical bore 30 is pressing against the side of the lugs 20 and 22 and the diagonal slit, or gap, 18 gives in effect a toggle action, at this stage of the operation, which securely holds nut 28 against rotation.

When it is desired to remove my device from the battery terminal post, a reversal of this operation takes place in that nut 28 is revolved in a contra-clockwise direction, as viewed, for one-quarter of a turn or ninety degrees of revolution. Now, normally, these devices are made of lead, or high lead alloy so that they are not particularly resilient, and would not, normally, of their own retained tension expand to their original position. To assure the expansion of lugs 20 and 22 so that the original gap 18 will be returned, I have so arranged lugs 34 and 36 that they will abut the opposite side of lugs 24 and 26 after the showing of Figure 3 so that the final operation in releasing the device will be to press lugs 20 and 22 apart, at the end of the opening movement, where the major action of the ellipse will be so placed as to receive these spread lugs 20 and 22.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. The combination in a connector-clamp with a collar having a laterally-projecting, circular boss and coinciding splits in said collar and boss extending diagonally of the collar, and opposed end-lugs on said boss having diagonal faces, of a nut having an eccentric inner bore and mounted for partial rotation on the boss, opposed cam-lugs on the inner bore of the nut, and said cam-lugs having diagonal faces alined with the minimum diameter of the eccentric bore for frictional engagement with the diagonal faces of the end-lugs.

2. The combination in a connector-clamp with a tapered collar having an exterior terminal-socket, a laterally-projecting, round, tapered boss integral with the collar and coinciding splits in said collar and boss extending diagonally of the collar, and opposed end-lugs on said boss having diagonal faces, of a nut having an eccentric inner bore tapered in direction opposite to that of the boss and permanently mounted thereon for partial rotation, opposed cam-lugs on the inner bore of the nut, and said cam-lugs having diagonal faces alined with the minimum diameter of the eccentric bore for frictional engagement with the faces of the boss-lugs.

3. The combination in a connector-clamp with a collar having a lateral, round, boss and coinciding splits on said collar and boss whereby the collar may be spaced or closed at said split to or from substantially elliptical shape, and opposed end-lugs on the boss having diagonal faces, of a nut having an elliptical bore and mounted for partial rotation on the boss, and opposed cam-lugs on the inner wall of the nut having diagonal faces for frictional engagement with the diagonal faces of the end-lugs.

4. The combination in a connector-clamp with a collar having a round, tapered, laterally projecting boss and coinciding splits in said boss and collar extending diagonally of the latter whereby said boss may be altered from round to substantially elliptical shape, of a nut having an elliptical bore tapered in the direction opposite to that of the boss and mounted for frictional engagement with and partial rotation on, the boss to clamp the latter, and co-acting means on the nut and boss for clamping the collar.

CHARLES G. WRIGHT.